United States Patent Office 3,160,131
Patented Dec. 8, 1964

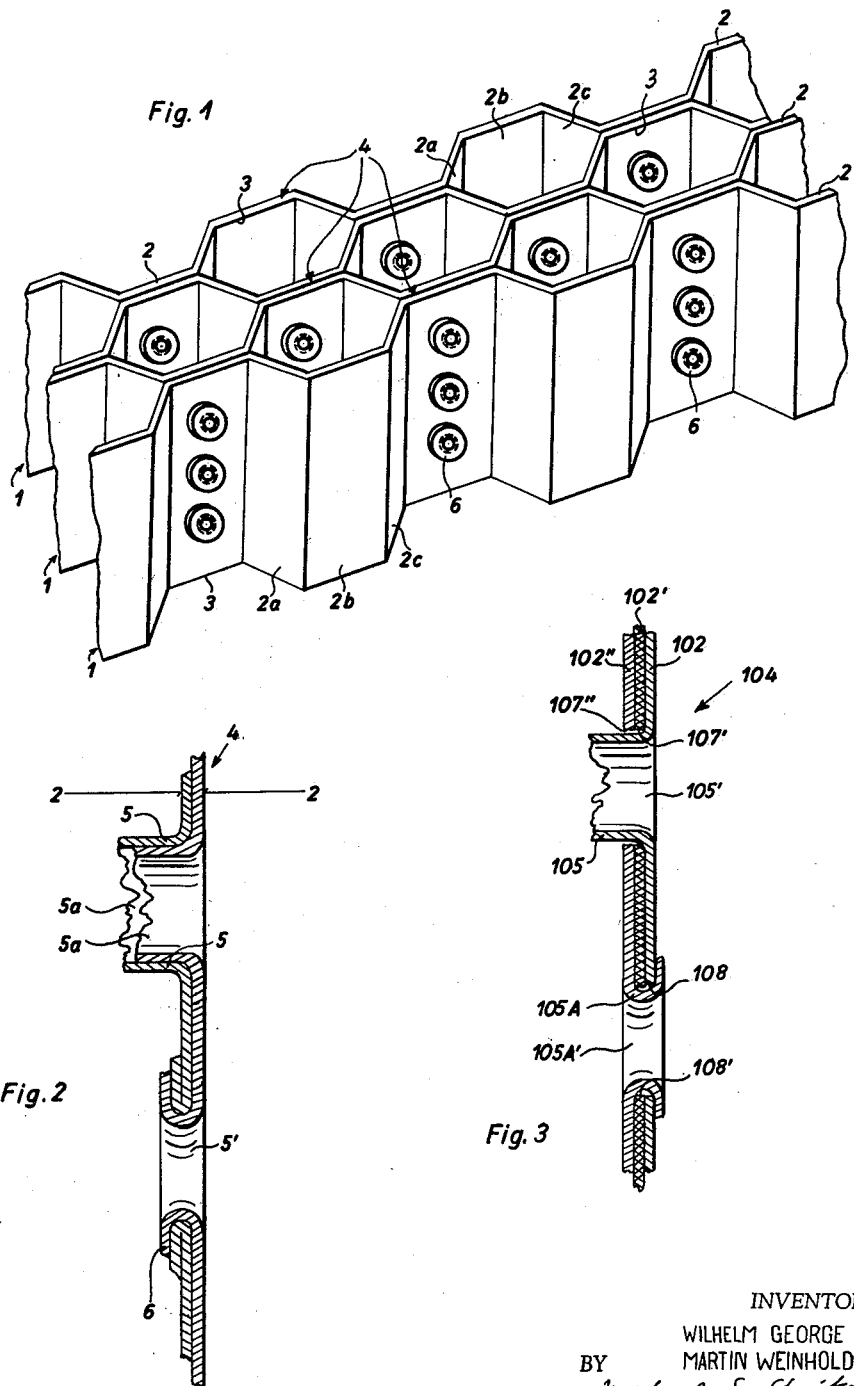

3,160,131
METHOD OF PRODUCING HONEYCOMB STRUCTURES
Wilhelm George and Martin Weinhold, Dresden, Germany, assignors to VEB Flugzeugwerke Dresden, Dresden, Germany
Filed Mar. 1, 1961, Ser. No. 92,600
1 Claim. (Cl. 113—116)

The present invention relates to improvements in honeycomb structures and to a method of producing the same. More particularly, the invention relates to a method of producing honeycomb structures of the type adapted to be used as sandwich- or stressed skin constructions for use as load-carrying structures in certain makes of aircraft and the like.

It is already known to produce honeycomb structures by connecting selected portions of preformed sheets with the help of an adhesive, by welding or by soldering (brazing) so that the sheets define between themselves a series of individual cells. However, the methods resorted to in the production of heretofore known honeycomb structures are time-consuming and rather expensive, especially since the abutting portions of the individual preformed sheets must be carefully cleaned prior to connecting them by subsequent application of adhesive, by a brazing or by a welding step. It is often necessary to chemically clean the surfaces of the abutting sheet portions which also increases the overall cost of the product. Furthermore, the finished honeycomb structure is often exposed to elevated temperatures which the conventional glued, welded or brazed joints cannot withstand without at least some weakening. As is known, joints obtained by the use of an adhesive are thermosensitive, soldered joints are destroyed at elevated temperatures, and a spot-welded joint is often weakened due to the fact that the high temperatures necessary for the welding step bring about structural changes causing brittleness of the welded sheet portions.

According to another prior proposal, a honeycomb structure is obtained by providing the individual sheets with extensions or flaps which are subsequently folded over each other to mechanically connect the sheets into the form of a honeycomb. A very serious drawback of such connections is that the folded-over extensions add to the overall weight of the honeycomb structure which is undesirable when the latter is used as a structural element in an aircraft and the like.

An important object of the present invention is to provide a method for the production of honeycomb structures according to which the joints between the individual sheets of the honeycomb structure may be joined without the application of heat, and according to which the weight of the honeycomb structures need not exceed the weight of honeycombs which are obtained by a gluing, brazing or welding process.

Another object of the invention is to provide a method of the just outlined characteristics which greatly reduces the cost of the honeycomb structures because it may be carried out without the application of heat, because it can be carried out without the use of adhesive, of welding equipment or of soldering equipment, and which insures that the structure of the sheets at the joints remains unchanged.

A further object of the instant invention is to provide a method of the above outlined type according to which the sheets of a honeycomb or like structure may be joined in such a way that they cannot become separated under the action of heat, and that the weight of the honeycomb structure is even less than the combined weight of the individual sheets prior to the formation of joints, and which insures that the resulting structure can withstand much higher shearing stresses than the honeycomb structures of presently known design.

A concomitant object of our invention is to provide a honeycomb structure which is not affected by elevated temperatures, which can withstand high shearing stresses, whose weight is less than the weight of heretofore known honeycomb structures, and which may be produced in many different sizes and shapes.

Still another object of the invention is to provide a honeycomb structure of the just outlined characteristics whose walls may consist of individual sheets or which may comprise laminated walls consisting of two or more sheets.

With the above objects in view, the invention resides in the provision of a method comprising the steps of placing selected portions of preformed sheets into abutment with each other so that the abutting sheet portions form multi-layer packages, piercing holes into the packages in such a way that one, two or all sheet portions of the respective packages form hollow rivets which project beyond the exposed sides of the packages, and flanging the hollow rivets so that the latter form rigid mechanical connections between the sheet portions which remain unaffected by temperature changes and which insure that the resulting honeycomb structure is one of very high shearing strength.

In accordance with an important feature of our invention, the multi-layer packages may consist of one or more sheet portions which are formed with cutouts or openings, and of one or more sheet portions which are without such openings. The holes are pierced into the sheet portions which are without openings and the resulting hollow rivets project through the respective openings to be subsequently flanged about the openings through which they pass whereby the sheet portions are rigidly connected to each other even though only one thereof must actually form a hollow rivet. Such method is of considerable advantage because the weight of the honeycomb structure is even less than the combined weight of the sheets prior to the formation of joints since the cutting of openings in one or more sheets results in reduced weight of the apertured sheets.

The holes may be pierced from the one, from the other, or from both sides of a multi-layer package, and each package may comprise two, three or more sheet portions. The individual sheets may consist of a metal which, in some instances, is extremely thin, e.g. in the range of say twenty five thousandths of an inch.

The novel features which are considered as characteristic of the invention are set forth in particular in the appended claim. The invention itself, however, both as to its construction and its method of operation, together with additional objects and advantages thereof, will be best understood from the following detailed description of certain specific embodiments when read in connection with the accompanying drawings, in which:

FIG. 1 is a schematic perspective view of a honeycomb structure which is assembled in accordance with the method of our invention;

FIG. 2 is a greatly enlarged section through a two-layer package whose individual components are joined in accordance with our method; and FIG. 3 is a section through a multi-layer package which consists of three components and wherein two of the components are formed with openings for the hollow rivets of the third component.

Referring now in greater detail to the drawings, and first to FIG. 1, there is shown a honeycomb structure which comprises a plurality of suitably configurated sheets 1 each of which comprises spaced coplanar portions 2 and a number of mutually inclined intermediate portions 2a, 2b, 2c which together form the walls of honeycomb-shaped cells 3. The individual cells defined by a pair of adjacent sheets 1 are separated by the coplanar sheet portions 2 which are in face-to-face abutment with each other and which are joined in a novel way as is best shown in FIG. 2. Thus, the abutting sheet portions 2 constitute the components of a two-layer package 4 which is pierced in a direction from the right to the left, as viewed in FIG. 2, so that the sheet portions 2 form hollow rivets 5 terminating in substantially orange peel shaped portions 5a. In the final step, the projecting end portions 5a of the rivets are flanged against the exposed left-hand side of the package 4, as at 6, so that the rivets are transformed into annular beads which surround the respective openings pierced in the package 4, which insures that the sheet portions 2 are rigidly fixed to each other and that the resulting connection is entirely independent from temperature changes. In addition, such connection insures that the honeycomb structure can withstand very high shearing stresses. In fact, the material of the hollow rivets is strain-hardened during the flanging step so that the flange 6 offers a substantial resistance to bending.

In accordance with a modification of our method, the connection consisting of hollow rivets 5 may be strengthened by a preceding or subsequent gluing, welding or soldering step. For example, the pressures applied to the sheet portions 2 during the piercing of holes 5' leading to the formation of hollow rivets 5 may be utilized in the gluing, soldering or welding step.

Referring to FIG. 3, there is shown a multi-layer package 104 which comprises three sheet portions 102, 102', 102" and wherein the holes 105', 105A' are formed from the opposite exposed sides of the package. The sheet portions 102', 102" are formed with aligned openings 107', 107", respectively, and the sheet portion 102 is formed with a hollow rivet 105 which projects through and beyond the openings 107', 107" to be subsequently flanged against the left-hand exposed side of the package 104. In addition, the sheet portions 102, 102' are respectively formed with aligned openings 108, 108' for the passage of a hollow rivet 105A which is obtained by piercing a hole into the sheet portion 102" so that the rivet 105A projects through the openings 108, 108' and may be flanged against the exposed right-hand side of the package 104. The provision of openings in at least one sheet portion is advisable whenever the package consists of three or more sheet portions. As can be readily understood by referring to FIG. 1, the sheet portions 102', 102" may form part of a composite sheet or wall of the honeycomb structure, and the other sheet portion 102 forms part of a unitary wall. Of course, if the package consists of four sheet portions, each cell wall may consist of two sheets.

A very important advantage of honeycomb structures produced in accordance with our method is that their walls need not be formed with special apertures for the equalization of pressures which develop in the cells 3 when the individual zones of the honeycomb structure are heated to different temperatures. The rivet holes 5' perform the function of pressure equalizing apertures and, in certain instances, such rivet holes may be used for the communication of a fluid medium between the adjacent cells 3.

It will be readily understood that our method is not restricted to the production of honeycomb structures which define cells of hexagonal cross-sectional contour. For example, the cells may assume a rhomboidal, trapeziform, rectangular or any other shape, or the sheets 1 may be undulated without a pronounced formation of wall sections 2a–2c. Furthermore, the novel method may be resorted to for adding one or more sheets to an existing honeycomb structure.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

A method of producing honeycomb and like structures of preformed sheets which comprises the steps of forming openings in selected portions of at least two sheets and placing said selected portions into abutment with each other so that the openings of one sheet are aligned with the openings of the second sheet, placing selected portions of a third sheet into abutment with the selected portions of said first mentioned sheets whereby said selected portions form multi-layer packages, piercing holes into the exposed sides of the selected portions of said third sheet to form hollow annular rivets which project through and beyond the aligned openings of said first mentioned sheets, and flanging the rivets about the respective openings to thereby rigidly connect the sheet portions of each package to each other by transforming each rivet into an annular bead around each hole.

References Cited in the file of this patent

UNITED STATES PATENTS

| 2,457,148 | Hall et al. | Dec. 28, 1948 |
| 2,609,068 | Pajak | Sept. 2, 1952 |
| 2,905,123 | Dean | Sept. 22, 1959 |

FOREIGN PATENTS

| 504,550 | Germany | Feb. 24, 1927 |